United States Patent
Arnett et al.

(10) Patent No.: US 8,260,856 B2
(45) Date of Patent: *Sep. 4, 2012

(54) AUTOMATED WEB CONFERENCE SYSTEM FOR GENERATING HIGHER QUALITY OF PRESENTATION SLIDE BY CLIENT AND SUBMITTING TO SERVER

(75) Inventors: Manuel B. Arnett, Lexington, KY (US); William M. Quinn, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/154,366

(22) Filed: Jun. 6, 2011

(65) Prior Publication Data

US 2011/0238769 A1    Sep. 29, 2011

Related U.S. Application Data

(63) Continuation of application No. 12/632,781, filed on Dec. 7, 2009, now Pat. No. 8,010,603.

(51) Int. Cl.
*G06F 15/16* (2006.01)
(52) U.S. Cl. .......... 709/204; 709/205; 709/217
(58) Field of Classification Search .......... 709/204, 709/205, 217, 226; 715/731, 723; 710/48; 345/204, 716; 382/128; 725/93
See application file for complete search history.

(56) References Cited

U.S. PATENT DOCUMENTS

| 5,742,772 | A * | 4/1998 | Sreenan ............ 709/226 |
| 6,646,655 | B1 * | 11/2003 | Brandt et al. ........ 715/723 |
| 7,383,346 | B2 | 6/2008 | Gemmell |
| 7,496,236 | B2 | 2/2009 | Fogg |
| 2002/0112244 | A1 * | 8/2002 | Liou et al. ........ 725/93 |
| 2002/0140719 | A1 * | 10/2002 | Amir et al. ........ 345/716 |
| 2004/0103150 | A1 | 5/2004 | Ogdon et al. |
| 2004/0222983 | A1 * | 11/2004 | Kakemura ........ 345/204 |
| 2004/0267981 | A1 * | 12/2004 | Kakemura ........ 710/48 |
| 2007/0209005 | A1 | 9/2007 | Shaver et al. |
| 2008/0292159 | A1 * | 11/2008 | Soenksen et al. ...... 382/128 |
| 2010/0031152 | A1 * | 2/2010 | Villaron et al. ........ 715/731 |

FOREIGN PATENT DOCUMENTS

WO    0065837 A1    11/2000

OTHER PUBLICATIONS

United States Patent and Trademark Office, Notice of Allowance for U.S. Appl. No. 12/632,781, Apr. 28, 2011, pp. 1-11, Alexandria, VA, USA.

* cited by examiner

*Primary Examiner* — Le H Luu
(74) *Attorney, Agent, or Firm* — Lee Law, PLLC; Christopher B. Lee (57) ABSTRACT

A web conference client device determines that it is configured to generate a higher-quality rendered output than a quality of a web conference presentation slide received from a server. A slide presentation file associated with the web conference presentation slide is received from the server. Rendered output of the slide presentation file is generated. The rendered output of the slide presentation file is sent to the server.

24 Claims, 4 Drawing Sheets

AUTOMATED WEB CONFERENCE SYSTEM FOR GENERATING HIGHER QUALITY OF PRESENTATION SLIDE BY CLIENT AND SUBMITTING TO SERVER

RELATED APPLICATIONS

This application is a continuation of and claims priority to and claims the benefit of U.S. patent application Ser. No. 12/632,781 titled "AUTOMATED WEB CONFERENCE PRESENTATION QUALITY IMPROVEMENT," which was filed in the U.S. Patent and Trademark Office on Dec. 7, 2009, and that had a title change to "AN AUTOMATED WEB CONFERENCE SYSTEM FOR GENERATING HIGHER QUALITY OF PRESENTATION SLIDE BY CLIENT AND SUBMITTING TO SERVER," with a current status of Allowed, and which is incorporated herein by reference as originally filed in its entirety.

BACKGROUND

The present invention relates to web conference presentations. More particularly, the present invention relates to automated web conference presentation quality improvement.

Web conferencing is used to create web-based meetings. A presentation to be presented during a web conference may be stored on a server prior to the web conference. The presentation may then be distributed to computing devices used by web conference participants during the web conference.

BRIEF SUMMARY

A method includes determining, via a web conference client device, that the web conference client device is configured to generate a higher-quality rendered output than a quality of a web conference presentation slide received from a server; receiving a slide presentation file associated with the web conference presentation slide from the server; generating rendered output of the slide presentation file; and sending the rendered output of the slide presentation file to the server.

A system includes a communication module; and a processor programmed to: determine that a local application is configured to generate a higher-quality rendered output than a quality of a web conference presentation slide received from a server; receive a slide presentation file associated with the web conference presentation slide from the server; generate rendered output of the slide presentation file using the local application; and send the rendered output of the slide presentation file to the server.

A computer program product includes a computer readable storage medium having computer readable program code embodied therewith, the computer readable program code comprising: computer readable program code configured to determine that a local application is configured to generate a higher-quality rendered output than a quality of a web conference presentation slide received from a server; computer readable program code configured to receive a slide presentation file associated with the web conference presentation slide from the server; computer readable program code configured to generate rendered output of the slide presentation file using the local application; and computer readable program code configured to send the rendered output of the slide presentation file to the server.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated web conference presentation quality improvement. During a web conference presentation, a web conference presentation slide is received from a server at a web conference client device. The web conference client device determines that the web conference client device is configured to generate a higher-quality rendered output than a quality of the web conference presentation slide received from the server. A slide presentation file associated with the web conference presentation slide is received from the server. Rendered output of the slide presentation file is generated. The rendered output of the slide presentation file is sent to the server. As such, participants associated with the web conference may receive improved higher-quality rendered output than the lower-quality rendered output produced or stored by the server.

Based upon the present subject matter, a presentation may start with an inferior rendition of a slide presentation, and seamlessly adjust to a higher-quality rendition without any users needing to take any action. Further, a computing device associated with a user that created the slide presentation file may be used to upload the slide presentation file to be used during the slide presentation to the server. The computing device may request the server to render the slide presentation file for presentation or may upload rendered output generated by an older version of an application. Regarding a request for the server to render the slide presentation file, the server may not have access to or a license for the application that created the slide presentation file. In such a situation, quality of the rendering performed by the server may be of poor quality. Regarding uploaded rendered output from an older version of an application, newer versions of the application may be available to computing devices that attend a web conference. In either situation, a computing device attending a web conference may determine whether they have a license to the application that created the slide presentation file or a newer version of the application that created the slide presentation file, respectively. As such, the computing device may determine that it may perform processing to improve upon the rendered output received from the server. Upon determining that the computing device has an application useable to improve the rendered output received from the server, the computing device requests the original slide presentation file from the server, renders the output, and uploads improved rendered output to the server for distribution during the web conference.

Alternatively, the computing device may render the output for use during the web conference and send a notification to the server that the slide presentation file is already rendered. In such a situation, a different web conference device may still determine that it has an application that may provide the improved higher-quality rendered output as described herein. For example, the web conference device may determine that it has a newer version of the application that created the slide presentation file installed, or may determine that it has a higher-resolution rendering application installed. In response to such a determination, the web conference device may provide the automated web conference presentation quality improvement to further improve the quality of the rendered output.

Web conference slide presentation files may be created by a variety of applications. Slide presentation files may include many slides for use during a slide presentation, such as a web conference. These applications used to create a slide presentation file may or may not be accessible by a server that stores the slide presentation file for a web conference. Without access or a license to open the slide presentation file to create a rendered output using the application that created the slide presentation file, the server may execute another application or an output rendering application that creates rendered output slides. The rendered output slide may be of a quality that is inferior to a rendered output quality that would otherwise be rendered if the server had access or a license to the application that created the slide presentation file. Accordingly, the present subject matter provides a distributed approach to improving rendered output for slide presentations based upon an individual web conference device rendering improved output.

The determination by the web conference device that it is configured to generate the higher-quality rendered output than the quality of the web conference presentation slide received from the server may be based upon metadata associated with the web conference presentation slide received from the server. This slide metadata may identify an application used to create the slide presentation file and may also identify an application that rendered the web conference presentation slide. The web conference device may determine, based upon the metadata received from the server, that the application used to create the slide presentation file is different from the application that rendered the web conference presentation slide. The web conference device may further determine that the application used to create the slide presentation file is associated with the web conference client device.

It is understood that any suitable messaging protocol and related semantic framework may be used to support the various messaging and metadata described herein. As one example of a messaging protocol that may be used in association with the present subject matter, the hypertext transfer protocol (HTTP) and its related semantics, may be used. However, it is further understood that other protocols and semantic frameworks may be used in association with the present subject matter and all are considered within the scope of the present subject matter.

Receiving the slide presentation file associated with the web conference presentation slide from the server may be performed in response to sending a request for the slide presentation file to the server. The web conference device may further send a request for the slide presentation file to the server that includes a file access lock request (e.g., a semaphore or other form of lock request) for the slide presentation file. The server may perform a lock operation for the slide presentation file in response to the file access lock request. As such, the server may grant the lock request so that the web conference device may perform enhanced rendering for the present slide or for the slide presentation file. The web conference device receives a notification from the server that the slide presentation file is locked.

Additionally, each other web conference device associated with the web conference may receive an event indicating that the slide presentation file is locked. In response, each web conference device may defer attempts to improve quality of the web conference slide presentation. As such, a real-time collaborative network of web conference devices may be formed including a state sharing mechanism for web conference slide presentation quality improvement.

The web conference device may begin processing the slide presentation file with the lock activated on the server without other web conference devices obtaining or replacing the slide presentation file on the server. The web conference device may further send metadata that identifies an application that generated the rendered output of the slide presentation file. This metadata may be used by other web conference devices to determine whether further improvement of the rendered output may be performed. For example, where the application that generated the slide presentation file is used to generate the rendered output, no further improvement may be available. Alternatively, where an application other than the application that generated the slide presentation file is used to generate the rendered output, further improvement may be possible by other web conference devices.

In association with sending the rendered output to the server, the web conference device may send a request to the server, along with or in association with the rendered output, for the server to perform a file access unlock request (e.g., a semaphore or other form of unlock request). In response, the server may unlock access to the slide presentation file.

The web conference device may further send a request for the server to invalidate a cached version of the web conference presentation slide or slide presentation file. In response to such a request, the server may invalidate an associated cached version of the web conference presentation slide or slide presentation file to cause other web conference devices to retrieve the newly-rendered version stored by the web conference device to the server. This cached version may be associated with each individual web conference device participating in the web conference. In such an implementation, the server may send a message to each web conference device instructing it to invalidate cached rendered output.

Each web conference device may receive an updated version of the web conference presentation slide from the server. The web conference device may further verify that the updated version of the web conference presentation slide is associated with the generated rendered output of the slide presentation file sent to the server. This determination may again be made by evaluation of metadata associated with the received web conference presentation slide. For example, where the metadata received by the web conference device that generated the rendered output, and metadata identifying the application used to generate the output, is sent to the server, the web conference device may verify that the received metadata identifies the application used to generate the output. Alternatively, were the web conference device uses an application other than an application that created the slide presentation file, the web conference device may determine whether another web conference device has performed further improvement of the rendered output.

The web conference device may further send a message to the server, or send a request in association with the request for the slide presentation file, instructing the server to terminate rendering activities associated with the slide presentation file upon determining that the web conference client device is configured to generate the higher-quality rendered output than the quality of the web conference presentation slide received from the server. This may allow the slide presentation to be improved with distribution of the next web conference slide without further distribution of lower-quality slides.

The automated web conference presentation quality improvement described herein may be performed in real time to allow prompt modification of individual slides associated with a web conference presentation or entire web conference presentations. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
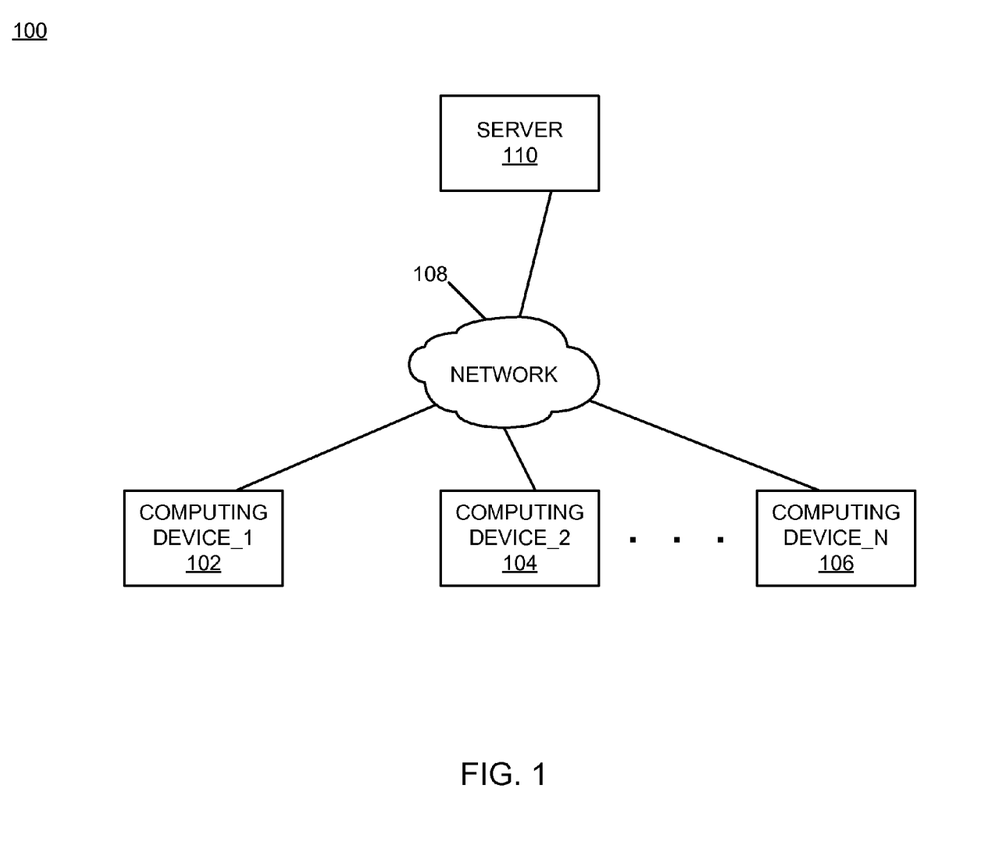
FIG. 1 is a block diagram of an example of an implementation of a system for automated web conference presentation quality improvement according to an embodiment of the present subject matter.

FIG. 1 is a block diagram of an example of an implementation of a system 100 for automated web conference presentation quality improvement. A computing device_1 102, a computing device_2 104, through a computing device_N 106 communicate via a network 108 with a server 110. For purposes of the present subject matter, each of the computing device_1 102 through the computing device_N 106 represents a web conference computing device.

As will be described in more detail below in association with FIG. 2 through FIG. 4, any of the computing device_1 102 through the computing device_N 106 provides automated web conference presentation quality improvement. The automated web conference presentation quality improvement is based upon any of the computing device_1 102 through the computing device_N 106 determining that it is configured to generate a higher-quality rendered output than a quality of the web conference presentation slide received from the server 110.

It should be noted that the computing device_1 102 through the computing device_N 106 may be a portable computing device, either by a user's ability to move the respective computing device to different locations, or by the computing device's association with a portable platform, such as a plane, train, automobile, or other moving vehicle. It should also be noted that the computing device_1 102 through the computing device_N 106 may be any computing device capable of processing information as described above and in more detail below. For example, the computing device_1 102 through the computing device_N 106 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The network 108 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
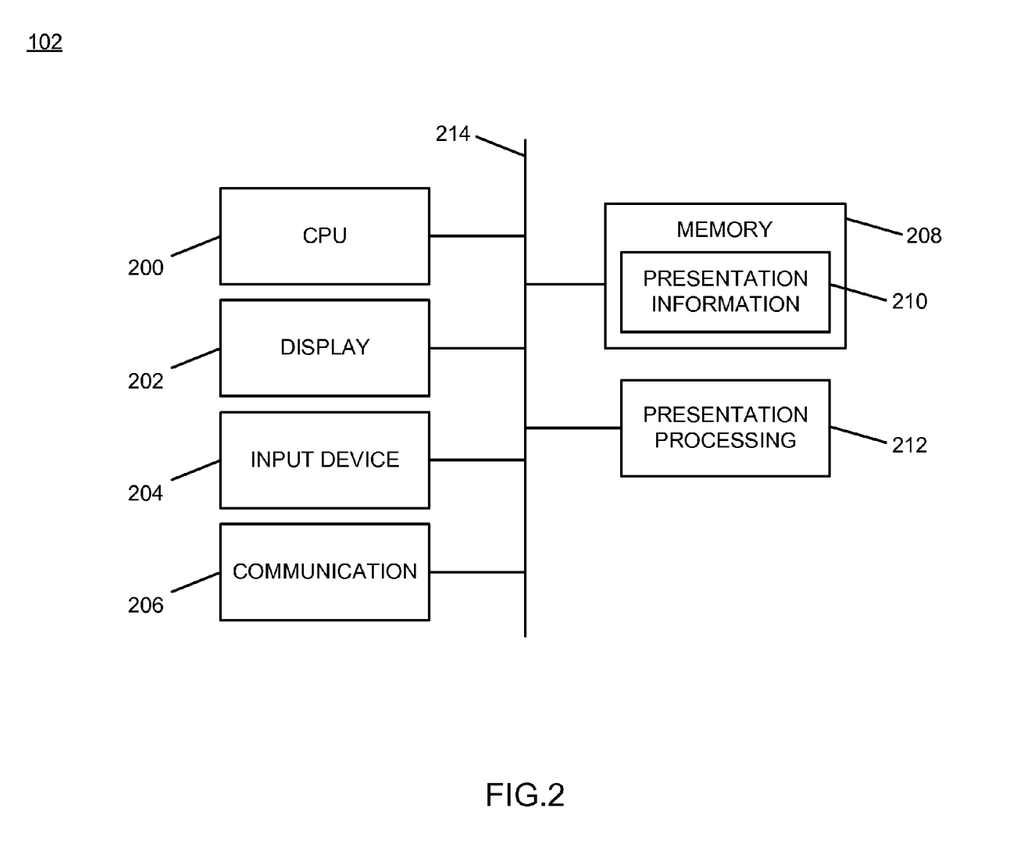
FIG. 2 is a block diagram of an example of an implementation of a computing device capable of performing automated web conference presentation quality improvement according to an embodiment of the present subject matter.

FIG. 2 is a block diagram of an example of an implementation of the computing device_1 102 capable of performing automated web conference presentation quality improvement. It is understood that the example implementation of the computing device_1 102 applies at least equally to each of the computing device_2 104 through the computing device_N 106. As such, a separate description of each of the computing device_2 104 through the computing device_N 106 is omitted herein for brevity.

A central processing unit (CPU) 200 provides computer instruction execution, computation, and other capabilities within the computing device_1 102. A display 202 provides visual information to a user of the computing device_1 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

A communication module 206 provides interconnection capabilities that allow the computing device_1 102 to communicate with other modules within the system 100, such as the server 110, to receive, modify, and upload web conference presentation slides and files. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 may include any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

A memory 208 includes a presentation information storage area 210 that stores web conference presentation files and related processing information for the computing device_1 102. As will be described in more detail below, the presentation information stored within the presentation information storage area 210 is used to process web conference presentation slides and web conference presentation files to improve presentation quality of slides during a web conference. The presentation information may further include a cache storage location (not shown) for storage of slides received from the server 110.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

A presentation processing module 212 is also illustrated. The presentation processing module 212 provides analytical and processing capabilities for the computing device_1 102, as described above and in more detail below. The presentation processing module 212 implements the automated web conference presentation quality improvement of the computing device_1 102.

Though the presentation processing module 212 is illustrated as a component-level module for ease of illustration and description purposes, it should be noted that the presentation processing module 212 may include any hardware, programmed processor(s), and memory used to carry out the functions of this module as described above and in more detail below. For example, the presentation processing module 212 may include additional controller circuitry in the form of application specific integrated circuits (ASICs), processors, and/or discrete integrated circuits and components for performing communication and electrical control activities associated with the respective devices. Additionally, the presentation processing module 212 may also include interrupt-level, stack-level, and application-level modules as appropriate. Furthermore, the presentation processing module 212 may include any memory components used for storage, execution, and data processing for performing processing activities associated with the module.

It should also be noted that the presentation processing module 212 may form a portion of other circuitry described without departure from the scope of the present subject matter. Further, the presentation processing module 212 may alternatively be implemented as an application stored within the memory 208. In such an implementation, the presentation processing module 212 may include instructions executed by the CPU 200 for performing the functionality described herein. The CPU 200 may execute these instructions to provide the processing capabilities described above and in more detail below for the computing device_1 102. The presentation processing module 212 may form a portion of an interrupt service routine (ISR), a portion of an operating system, a portion of a browser application, or a portion of a separate application without departure from the scope of the present subject matter.

It is further understood that the presentation processing module 212 may include one or more applications to generate the rendered output of the slide presentation file. The presentation processing module 212 may alternatively invoke one or more applications stored within the memory 208 (not shown) to generate the rendered output of the slide presentation file. As such, the presentation processing module 212 may either include or control the generation of the rendered output, as appropriate for a given implementation.

The CPU 200, the display 202, the input device 204, the communication module 206, the memory 208, and the presentation processing module 212 are interconnected via an interconnection 214. The interconnection 214 may include a system bus, a network, or any other interconnection capable of providing the respective components with suitable interconnection for the respective purpose.

While the computing device_1 102 is illustrated with and has certain components described, other modules and components may be associated with the computing device_1 102 without departure from the scope of the present subject matter. Additionally, it should be noted that, while the computing device_1 102 is described as a single device for ease of illustration purposes, the components within the computing device_1 102 may be co-located or distributed and interconnected via a network without departure from the scope of the present subject matter. For a distributed arrangement, the display 202 and the input device 204 may be located at a point of sale device, kiosk, or other location, while the CPU 200 and memory 208 may be located at a local or remote server. Many other possible arrangements for components of the computing device_1 102 are possible and all are considered within the scope of the present subject matter. Accordingly, the computing device_1 102 may take many forms and may be associated with many platforms.

Figure 3:
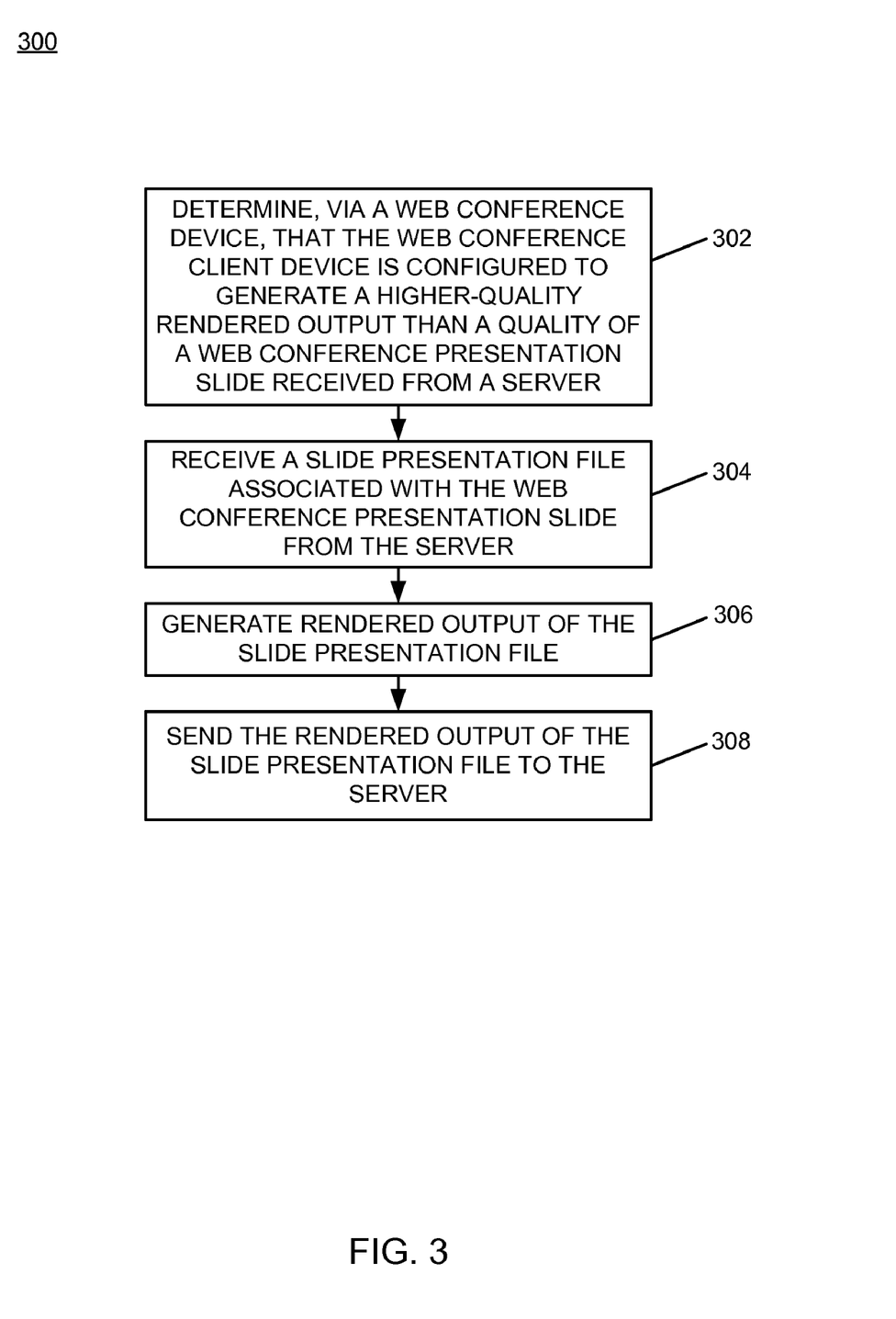
FIG. 3 is a flow chart of an example of an implementation of a process for automated web conference presentation quality improvement according to an embodiment of the present subject matter.
Figure 4:
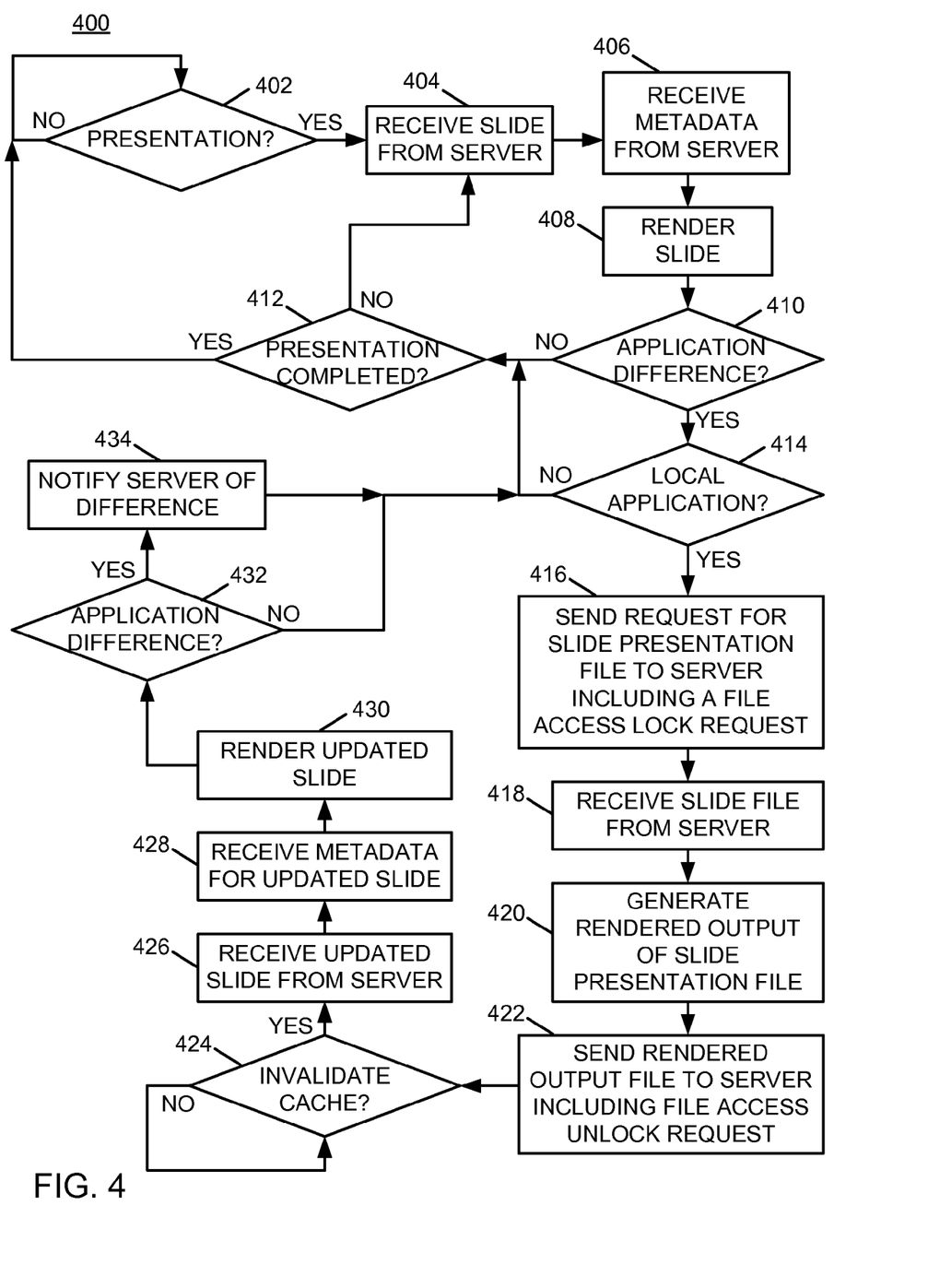
FIG. 4 is a flow chart of an example of an implementation of a process for automated web conference presentation quality improvement according to an embodiment of the present subject matter.

FIG. 3 through FIG. 4 below describe example processes that may be executed by devices, such as the computing device_1 102, to perform the automated web conference presentation quality improvement associated with the present subject matter. Many other variations on the example processes are possible and all are considered within the scope of the present subject matter. The example processes may be performed by modules, such as the presentation processing module 212 and/or executed by the CPU 200, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated web conference presentation quality improvement. At block 302, the process 300 determines, via a web conference device, that the web conference client device is configured to generate a higher-quality rendered output than a quality of a web conference presentation slide received from a server. At block 304, the process 300 receives a slide presentation file associated with the web conference presentation slide from the server. At block 306, the process 300 generates rendered output of the slide presentation file. At block 308, the process 300 sends the rendered output of the slide presentation file to the server.

FIG. 4 is a flow chart of an example of an implementation of a process 400 for automated web conference presentation quality improvement. At decision point 402, the process 400 makes a determination as to whether a presentation has been initiated. A presentation may be initiated, for example, in association with a web conference starting. When a determination is made that a presentation has been initiated, the process 400 receives a web conference presentation slide from a server, such as the server 110, at block 404. At block 406, the process 400 receives metadata associated with the web conference presentation slide received from the server. The metadata may identify a program used to create the slide presentation file and a program that rendered the web conference presentation slide. The process 400 may utilize this metadata, as described below, for determining whether rendered output of the received slide may be improved by the process 400. At block 408, the process 400 renders the received web conference slide.

At decision point 410, the process 400 makes a determination, based upon the metadata received from the server, as to whether the application used to create the slide presentation file is different from the application that rendered the web conference presentation slide. When a determination is made that the application used to create the slide presentation file is not different from the application that rendered the web conference presentation slide, the process 400 makes a determination at decision point 412 as to whether the presentation is completed. When a determination is made that the presentation is not completed, the process 400 returns to block 404 to receive the next slide. The description of processing for an affirmative decision at decision point 412 will be described in more detail below.

Returning to the description of decision point 410, when a determination is made, based upon the metadata received from the server, that the application used to create the slide presentation file is different from the application that rendered the web conference presentation slide, the process 400 makes a determination at decision point 414 as to whether a local application used to create the slide presentation file is associated with the respective web conference client device upon which the process 400 is operated. Alternatively, the process 400 may make a determination as to whether an updated or newer version of the application that created the slide presentation file, or another higher-resolution rendering application that may be used to improve quality of rendered output for the slide presentation file, is associated with the web conference client device. As such, at decision point 414, the process 400 determines whether the web conference client device is configured to generate a higher-quality rendered output than a quality of the web conference presentation slide received from the server.

When a determination is made at decision point 414 that the web conference client device is configured to generate a higher-quality rendered output than a quality of the web conference presentation slide received from the server, the process 400 sends a request for the slide presentation file to the server including a file access lock request at block 416. A file access lock request may include, for example, a semaphore or other form of lock request. The process 400 may further send, in association with the request to the server an instruction to the server to terminate rendering activities associated with the slide presentation file.

At block 418, the process 400 receives the slide presentation file associated with the web conference presentation slide from the server. The process 400 may further receive a notification from the server that the slide presentation file is locked.

At block 420, the process 400 generates rendered output of the slide presentation file. At block 422, the process 400 sends the rendered output of the slide presentation file to the server. The process 400 may further send a file access unlock request, such as a semaphore or other unlock request, to the server and metadata identifying an application that generated the rendered output of the slide presentation file. The process 400 may further send a request for the server to invalidate a cached version of the web conference presentation slide.

As described above, the server may send a message to each web conference client device instructing each device to invalidate its local cache entries for the slide presentation. As such, at decision point 424, the process 400 waits for an invalidate cache message to be received from the server. When a determination is made than an invalidate cache message has been received, the process 400 receives an updated version of the web conference presentation slide from the server at block 426. However, it is noted that the process 400 may also update the slide locally based upon the locally-generated output without departure from the scope of the present subject matter.

At block 428, the process 400 receives metadata associated with the updated slide. At block 430, the process 400 renders the updated slide. At decision point 432, the process 400 makes a determination as to whether the updated version of the slide is associated with the locally-generated rendered output. For example, the process 400 may use the received metadata to verify that the updated version of the web conference presentation slide is associated with the generated rendered output of the slide presentation file sent to the server. When a determination is made at decision point 432 that the updated version of the slide is not associated with the locally-generated rendered output (e.g., the application used to create the slide presentation file is different from the application that rendered the web conference presentation slide), the process 400 notifies the server of the determined difference at block 434. It should be noted however, that where another web conference client device is capable of providing further improvement to rendered output of a slide presentation file, that other web conference client device may perform such an improvement after the file is unlocked and available for further processing. In such a situation, the determination that the updated version of the slide is not associated with the locally-generated rendered output may not necessarily be an error condition.

When a determination is made that the updated version of the slide is associated with the locally-generated rendered output at decision point 432, or upon completion of notifying the server of the determined difference at block 434, the process 400 returns to decision point 412 and continues processing as described above. When a determination is made that the presentation is completed at decision point 412, the process 400 returns to decision point 402 to await another presentation to be initiated.

As such, the process 400 provides an example of a process for presenting slides associated with a web conference and for determining whether a local application may be used for improving a quality of rendered output associated with a slide presentation file associated with the web conference. The process 400 utilizes metadata associated with the slide presentation file to determine whether the actual application that generated the slide presentation file, a newer version of the application, or another application capable of higher-resolution rendered output is associated with the web conference computing device. The process 400 generates rendered output, sends it to the server along with metadata associated with the local processing, and verifies that new slides received have been updated.

As described above in association with FIG. 1 through FIG. 4, the example systems and processes provide automated web conference presentation quality improvement. Many other variations and additional activities associated with automated web conference presentation quality improvement are possible and all are considered within the scope of the present subject matter.

Those skilled in the art will recognize, upon consideration of the above teachings, that certain of the above examples are based upon use of a programmed processor, such as CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    distributing, via a web conference server device as part of a state sharing mechanism for web conference slide presentation quality improvement during a web conference, a rendered web conference presentation slide of a slide presentation file to each of a plurality of web conference client devices;
    sending, in response to a request for the slide presentation file from one of the plurality of web conference devices, the slide presentation file to the one of the plurality of web conference client devices;
    receiving from the one of the plurality of web conference client devices at least one updated slide of the slide presentation file rendered at a higher quality than the distributed rendered slide; and
    distributing, as part of the state sharing mechanism for web conference slide presentation quality improvement, the received at least one updated slide of the slide presentation file rendered at the higher quality than the distributed rendered web conference presentation slide to each of the plurality of web conference client devices.

2. The method of claim 1, where distributing, via the web conference server device as part of the state sharing mechanism for web conference slide presentation quality improvement during the web conference, the rendered web conference presentation slide of the slide presentation file to each of the plurality of web conference client devices further comprises distributing, to each of the plurality of web conference client devices, metadata associated with the rendered web conference presentation slide of the slide presentation file that identifies an application used to create the slide presentation file and an application that rendered the rendered web conference presentation slide of the slide presentation file.

3. The method of claim 1, further comprising:
    receiving a file access lock request with the request for the slide presentation file from the one of the plurality of web conference devices;
    activating a file access lock associated with the slide presentation file; and
    sending a notification to each other web conference client device of the plurality of web conference client devices that the slide presentation file is locked.

4. The method of claim 3, where:
    receiving from the one of the plurality of web conference client devices the at least one slide of the slide presentation file rendered at the higher quality than the distributed rendered slide further comprises receiving a file access unlock request and metadata identifying an application used by the one of the plurality of web conference devices to improve quality of the at least one slide of the slide presentation file; and
    further comprising sending a notification to each other web conference client device of the plurality of web conference client devices that the slide presentation file is unlocked and the metadata identifying the application used by the one of the plurality of web conference devices to improve the quality of the at least one slide of the slide presentation file.

5. The method of claim 1, further comprising receiving a request from the one of the plurality of web conference client devices to invalidate a cached version of one of the web conference presentation slide and the slide presentation file.

6. The method of claim 5, further comprising:
    determining where the cached version of the one of the web conference presentation slide and the slide presentation file is cached;
    invalidating, in response to determining that the web conference server stores the cached version of the one of the web conference presentation slide and the slide presentation file, the cached version of the one of the web conference presentation slide and the slide presentation file stored by the web conference server device; and
    sending, in response to determining that each of the plurality of web conference client devices stores the cached version of the one of the web conference presentation slide and the slide presentation file, a notification to each of the plurality of web conference devices instructing each of the plurality of web conference devices to invalidate the stored cached version of the one of the web conference presentation slide and the slide presentation file.

7. The method of claim 1, further comprising:
    receiving a request from the one of the plurality of web conference client devices instructing the web conference server device to terminate rendering activities associated with the slide presentation file; and
    terminating the rendering activities via the web conference server device for slides of the slide presentation file for the web conference.

8. The method of claim 1, further comprising:
    determining, via the web conference server device, that a license to a program used to create the slide presentation file is not available to the web conference server device; and
    rendering the rendered web conference presentation slide of the slide presentation file via an application other than the program used to create the slide presentation file.

9. A system, comprising:
    a communication module; and
    a processor programmed to, via the communication module:
        distribute, via a web conference server device as part of a state sharing mechanism for web conference slide presentation quality improvement during a web conference, a rendered web conference presentation slide of a slide presentation file to each of a plurality of web conference client devices;
        send, in response to a request for the slide presentation file from one of the plurality of web conference devices, the slide presentation file to the one of the plurality of web conference client devices;
        receive, from the one of the plurality of web conference client devices, at least one updated slide of the slide presentation file rendered at a higher quality than the distributed rendered slide; and distribute, as part of the state sharing mechanism for web conference slide presentation quality improvement, the received at least one updated slide of the slide presentation file rendered at the higher quality than the distributed rendered web conference presentation slide to each of the plurality of web conference client devices.

10. The system of claim 9, where, in being programmed to distribute, as part of the state sharing mechanism for web conference slide presentation quality improvement during the web conference, the rendered web conference presentation slide of the slide presentation file to each of the plurality of web conference client devices, the processor is further programmed to distribute, to each of the plurality of web conference client devices, metadata associated with the rendered web conference presentation slide of the slide presentation file that identifies an application used to create the slide presentation file and an application that rendered the rendered web conference presentation slide of the slide presentation file.

11. The system of claim 9, where the processor is further programmed to:
receive a file access lock request with the request for the slide presentation file from the one of the plurality of web conference devices;
activate a file access lock associated with the slide presentation file; and
send a notification to each other web conference client device of the plurality of web conference client devices that the slide presentation file is locked.

12. The system of claim 11, where:
in being programmed to receive from the one of the plurality of web conference client devices the at least one slide of the slide presentation file rendered at the higher quality than the distributed rendered slide, the processor is further programmed to receive a file access unlock request and metadata identifying an application used by the one of the plurality of web conference devices to improve quality of the at least one slide of the slide presentation file; and
the processor is further programmed to send a notification to each other web conference client device of the plurality of web conference client devices that the slide presentation file is unlocked and the metadata identifying the application used by the one of the plurality of web conference devices to improve the quality of the at least one slide of the slide presentation file.

13. The system of claim 9, where the processor is further programmed to receive a request from the one of the plurality of web conference client devices to invalidate a cached version of one of the web conference presentation slide and the slide presentation file.

14. The system of claim 13, where the processor is further programmed to:
determine where the cached version of the one of the web conference presentation slide and the slide presentation file is cached;
invalidate, in response to determining that the cached version of the one of the web conference presentation slide and the slide presentation file is stored in the memory, the cached version of the one of the web conference presentation slide and the slide presentation file stored in the memory; and
send, in response to determining that each of the plurality of web conference client devices stores the cached version of the one of the web conference presentation slide and the slide presentation file, a notification to each of the plurality of web conference devices instructing each of the plurality of web conference devices to invalidate the stored cached version of the one of the web conference presentation slide and the slide presentation file.

15. The system of claim 9, where the processor is further programmed to:
receive a request from the one of the plurality of web conference client devices instructing the web conference server device to terminate rendering activities associated with the slide presentation file; and
terminate the rendering activities for slides of the slide presentation file for the web conference.

16. The system of claim 9, where the processor is further programmed to:
determine that a license to a program used to create the slide presentation file is not available to the web conference server device; and
render the rendered web conference presentation slide of the slide presentation file via an application other than the program used to create the slide presentation file.

17. A computer program product comprising a computer readable storage medium including computer readable program code, where the computer readable program code when executed on a computer causes the computer to:
distribute, via a web conference server device as part of a state sharing mechanism for web conference slide presentation quality improvement during a web conference, a rendered web conference presentation slide of a slide presentation file to each of a plurality of web conference client devices;
send, in response to a request for the slide presentation file from one of the plurality of web conference devices, the slide presentation file to the one of the plurality of web conference client devices;
receive from the one of the plurality of web conference client devices at least one updated slide of the slide presentation file rendered at a higher quality than the distributed rendered slide; and
distribute, as part of the state sharing mechanism for web conference slide presentation quality improvement, the received at least one updated slide of the slide presentation file rendered at the higher quality than the distributed rendered web conference presentation slide to each of the plurality of web conference client devices.

18. The computer program product of claim 17, where, in causing the computer to distribute, via the web conference server device as part of the state sharing mechanism for web conference slide presentation quality improvement during the web conference, the rendered web conference presentation slide of the slide presentation file to each of the plurality of web conference client devices, the computer readable program code when executed on the computer further causes the computer to distribute, to each of the plurality of web conference client devices, metadata associated with the rendered web conference presentation slide of the slide presentation file that identifies an application used to create the slide presentation file and an application that rendered the rendered web conference presentation slide of the slide presentation file.

19. The computer program product of claim 17, where the computer readable program code when executed on the computer further causes the computer to:
receive a file access lock request with the request for the slide presentation file from the one of the plurality of web conference devices;

activate a file access lock associated with the slide presentation file; and send a notification to each other web conference client device of the plurality of web conference client devices that the slide presentation file is locked.

20. The computer program product of claim 19, where:

in causing the computer to receive from the one of the plurality of web conference client devices the at least one slide of the slide presentation file rendered at the higher quality than the distributed rendered slide, the computer readable program code when executed on the computer further causes the computer to receive a file access unlock request and metadata identifying an application used by the one of the plurality of web conference devices to improve quality of the at least one slide of the slide presentation file; and the computer readable program code when executed on the computer further causes the computer to send a notification to each other web conference client device of the plurality of web conference client devices that the slide presentation file is unlocked and the metadata identifying the application used by the one of the plurality of web conference devices to improve the quality of the at least one slide of the slide presentation file.

21. The computer program product of claim 17, where the computer readable program code when executed on the computer further causes the computer to receive a request from the one of the plurality of web conference client devices to invalidate a cached version of one of the web conference presentation slide and the slide presentation file.

22. The computer program product of claim 21, where the computer readable program code when executed on the computer further causes the computer to:

determine where the cached version of the one of the web conference presentation slide and the slide presentation file is cached;

invalidate, in response to determining that the web conference server stores the cached version of the one of the web conference presentation slide and the slide presentation file, the cached version of the one of the web conference presentation slide and the slide presentation file stored by the web conference server device; and send, in response to determining that each of the plurality of web conference client devices stores the cached version of the one of the web conference presentation slide and the slide presentation file, a notification to each of the plurality of web conference devices instructing each of the plurality of web conference devices to invalidate the stored cached version of the one of the web conference presentation slide and the slide presentation file.

23. The computer program product of claim 17, where the computer readable program code when executed on the computer further causes the computer to:

receive a request from the one of the plurality of web conference client devices instructing the web conference server device to terminate rendering activities associated with the slide presentation file; and terminate the rendering activities via the web conference server device for slides of the slide presentation file for the web conference.

24. The computer program product of claim 17, where the computer readable program code when executed on the computer further causes the computer to:

determine, via the web conference server device, that a license to a program used to create the slide presentation file is not available to the web conference server device; and render the rendered web conference presentation slide of the slide presentation file via an application other than the program used to create the slide presentation file.

* * * * *